June 23, 1970  G. BONNIVARD  3,516,822
SEPARATION PROCESS FOR NICKEL AND COBALT
Filed April 25, 1967
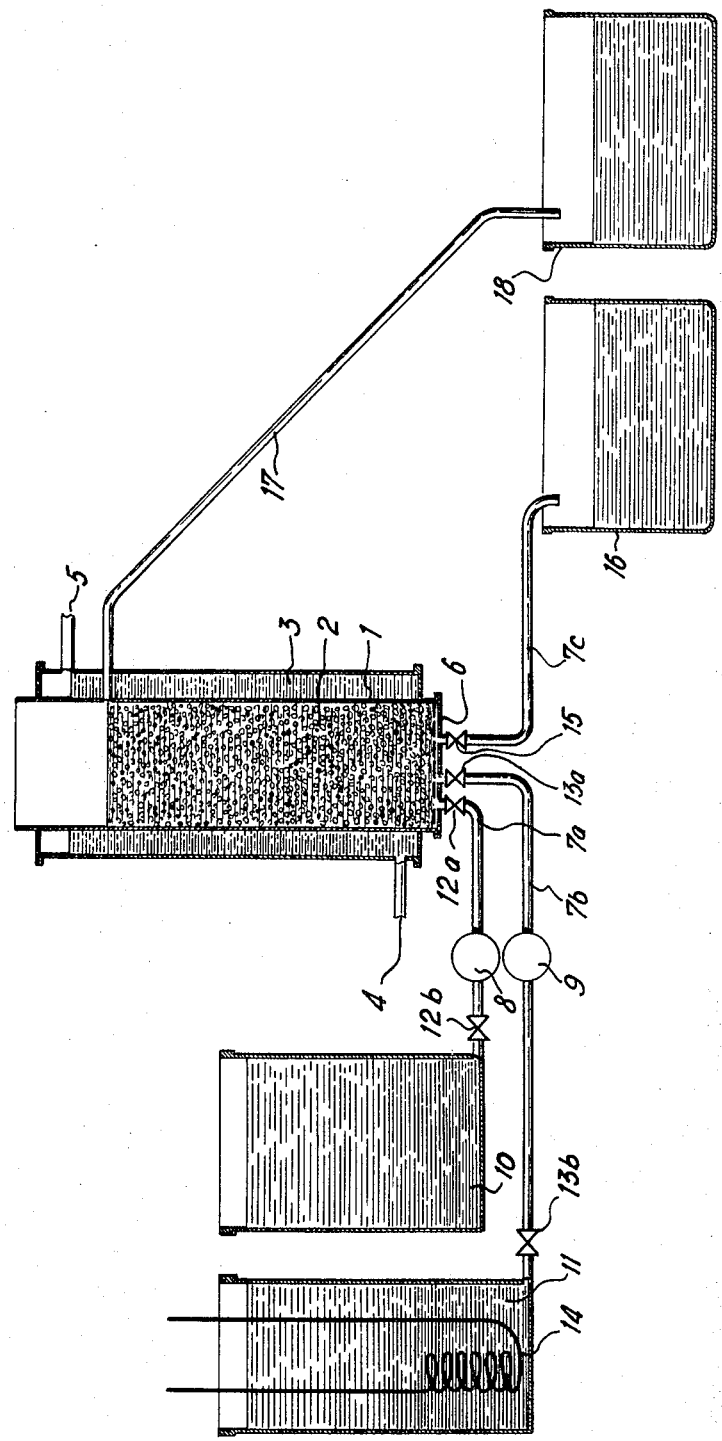

United States Patent Office 3,516,822
Patented June 23, 1970

3,516,822
SEPARATION PROCESS FOR NICKEL AND COBALT
Georges Bonnivard, Metz, France, assignor to Institut de Recherches de la Siderurgie Francaise, Saint Germain-en-laye, Yvelines, and Bureau de Recherches Geologiques et Minieres, Paris, France
Filed Apr. 25, 1967, Ser. No. 633,468
Claims priority, application France, Apr. 29, 1966, 59,593
Int. Cl. C22b 23/04
U.S. Cl. 75—103      11 Claims

ABSTRACT OF THE DISCLOSURE

An ammonium carbonate solution containing dissolved nickel and cobalt is passed through a reaction tower in which has been placed granular titanium phosphate. The cobalt is absorbed therein and the nickel is extracted in conventional manner from the ammonium carbonate solution passed out of the tower. An acid solution, particularly hydrogen chloride, is passed through the titanium phosphate in the tower to dissolve the cobalt, which is then recovered from the acid solution. The acid solution also causes the regeneration of the titanium phosphate. High yields, such as about 97% cobalt and 99.5% nickel can be obtained. Also, both metals are recovered in a high degree of purity.

BACKGROUND OF THE INVENTION

Nickel and cobalt are usually extracted from their ores, and particularly from nickel- and cobalt-bearing laterites, by subjecting the ore to a reduction treatment in which the two metals are selectively reduced to the metal state. This is usually followed by lixiviation with a carbonated ammoniacal solution which has the purpose to attack the two metals which enter in solution, as nickel and cobalt ammonium carbonate, the other components of the mineral not being subject to dissolving.

In order to separate the nickel and cobalt from the ammoniacal solution, several methods have been pursued. One, for instance, has been to separate the metals by selective dissolving of nickel. To this end, the ammoniacal parent solution containing the nickel and cobalt was distilled and the residue obtained was then subjected to further treatment by means of a carbonaed ammoniacal low $CO_2$ solution. The nickel in this solution dissolved in a preferential manner.

A different process consisted in separating the metals by selective precipitation. It was found that nickel compounds upon distillation of ammonia from the ammoniacal parent solution precipitated in the first stage together with only a very little cobalt. The thus formed precipitate was eliminated by filtration and the new filtrate subjected to distillation. The second precipitate still contained a very high proportion of nickel. The distillation and filtration operations were repeated several times. In the final precipitates, the proportion of nickel had diminished while that of cobalt increased. One followed this then usually with a separation of the two metals by an electrolytic method.

These processes, as appears, require a multiplicity of separating operations. They are long and bothersome, without at the same time affording a really clean separation of the two metals. The yield obtainable through these methods is therefore low.

SUMMARY OF THE INVENTION

The invention accordingly has the object to overcome these difficulties of the prior art and in particular to provide for a process of separation of nickel and cobalt that are present dissolved in a carbonated ammoniacal solution and in particular a solution of the type obtained during the course of treatment of laterites or similar minerals.

Anoher object of the invention is to provide a separation treatment for the metals dissolved, for instance, in an ammonium carbonate solution which can be carried out substantially in one single operation.

These objects are accomplished by the present invention which in summary is the following:

A carbonated ammoniacal solution containing dissolved nickel and cobalt is passed through titanium phosphate to cause absorption therein of the cobalt. The solution is then collected and the nickel is extracted therefrom while the cobalt is extracted from the titanium phosphate.

The extraction from titanium phosphate is preferably effected by passing an acid solution, such as a solution of hydrogen chloride, through the titanium phosphate, thus causing the cobalt to dissolve in the acid solution and effecting also a regeneration of the titatnium phosphate. The cobalt is then recovered from the acid solution.

Preferably, the reaction is caried out in a tower into which the titanium phosphate is placed and through which the ammonium carbonate solution passes from bottom to top. The titanium phosphate preferably is in the granulated form made by agglomerating phosphate powder with a polymerizable resin. The temperature in the tower should be between 20° and 80° C.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The only figure of the drawing shows, in a simplified form, an apparatus for carrying out the invention.

DESCRIPTION OF THE PREFERRED EMBODIMENTS

As thas been pointed out, the ammonium carbonate solution is passed through a tower containing granular titanium phosphate. The nickel is then recovered from the ammonium carbonate solution while an acid solution is passed through the tower to dissolve the cobalt which has been absorbed by the titanium phosphate and also to regenerate the titanium phosphate. The cobalt is recovered from the acid solution that is discharged from the tower.

Special additional features of the process are the following:

(a) A column is filled with titanium phosphate which is formed from granules obtained by agglomerating phosphate powder with a polymerizable resin.

(b) The carbonated ammoniacal solution may be passed through the titanium phosphate column in a direction from bottom to top.

(c) The temperature in the titanium phosphate column should be between 20° and 80° C., and preferably is set at 50° C.

The present invention is based on a specific property of titanium phosphate discovered by the applicant. That nickel when isolated or cobalt when isolated could be absorbed by titanium phosphate was known. However, applicant has found the surprising fact that by permitting an ammonium carbonate solution containing both nickel and cobalt to circulate through a column filled with titanium phosphate there occurs first an absorption of the cobalt while substantially all of the nickel is found in the ammoniacal solution after its passage through the column.

Applicant has also found that this preferential and virtually complete absorption takes place even though the proportion of cobalt in the solution may be low relative to the proportion of nickel.

The applicant has also found that the amount of cobalt which may thus be absorbed is quite substantial and can go up to 4% of the weight of the titanium phosphate.

The invention accordingly comprises the process summarized above, wherein the ammoniacal solution of nickel and cobalt is, for instance, obtained by the usual industrial process of treating nickel- or cobalt-bearing minerals such as laterites. The ammoniacal solution after passing through the column surprisingly no longer contains cobalt but only nickel. The cobalt, which has been absorbed in the titanium phosphate, can then be dissolved by means of the acid solution, which accordingly will contain only cobalt. Thus, the individual metals can be recovered from the ammoniacal solution on one hand and the acid solution on the other hand.

The titanium phosphate used in this process can easily be prepared by bringing into reaction titanium tetrachloride with a disodium phosphate solution at convenional temperature. The reaction is as follows:

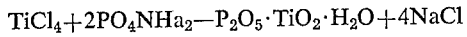

$$TiCl_4 + 2PO_4NHa_2 \rightarrow P_2O_5 \cdot TiO_2 \cdot H_2O + 4NaCl$$

After washing the reaction product, one collects a white powder of titanium phosphate. However, other titanium phosphates can likewise be used, such as, for instance: $2TiO_2 \cdot P_2O_5 \cdot 6H_2O$ or $TiO_2 \cdot HPO_3 \cdot H_2O$.

The pulverulent titanium phosphate is quite suited for the absorption of cobalt. This notwithstanding, the power offers a slight mechanical resistance and some difficulties may therefore be encountered due to an increasing obstruction of the column. These difficulties can be eliminated according to one feature of the invention by using granules formed by means of a cold agglomeration of the powder. The chemical binding agent for this operation can, for instance, be a polymerizable resin that is hardenable at temperatures below 100° C. There are thus formed granules of 0.1 to 3 mm. which are resistant to acids and bases, have an excellent mechanical strength and a long period of usefulness. The resin which is used as the binding agent is employed in low amounts, such as 10% by weight of the phosphate, and therefore does not in the least interfere with the performance of the titanium phosphate itself.

A further advantage of this mode of embodiment resides in the fact that the titanium phosphate granules can be regenerated. Actually, the absorption of cobalt takes place most probably by an ion exchange mechanism, such as $Co^+ \rightleftharpoons H^+$. In the extraction of cobalt by an acid solution, the hydrogen ions take the place of the cobalt ions in the titanium phosphate. The phosphate is therefore regenerated and can again be used for a later operation. Since, on the other hand, the mechanical properties of the granules are very good, one can use the titanium phosphate for a rather large number of operations.

As has been stated above, the ammonium solution is circulated in the titanium phosphate column for the bottom up. This technique permits an increasing and more effective imbibing by the phosphate and a better absorption of the cobalt. It will be understood that this technique may also be applied for the circulation of the acid solution in the column in order to dissolve the absorbed cobalt.

The temperature conditions in the phosphate column are quite important. It is therefore also a feature of the invention to maintain the temperature between 20° and 80° C. and preferably at 50° C. The absorption of cobalt is considerably accelerated at this temperature. Thus, at 50° C. the fixation of cobalt takes place at a two or three times more rapid pace than at 20° C. The cobalt absorption would be still more rapid above 50° C. but there would then occur a not entirely negligible distillation of ammonia. The 50° C. temperature is therefore to be preferred.

After washing the phosphate column with water, the acid solution is circulated through the column to dissolve the cobalt which has settled around the phosphate. For this purpose, hydrochloric acid of a technical grade and a 100 times dilution may be used which will at the same time effect the regeneration of the titanium phosphate. The separated metals can be extracted from the solution by conventional methods. Thus, the nickel can be recovered by distillation of the ammonia from the ammoniacal solution while the cobalt can be extracted from the acid solution electrolytically.

Two examples of the embodiments of the invention will now be described for illustrative purposes and for better understanding only, and without any intention of limitation.

With reference to the attached drawing, it will be seen that numeral 1 is a vertical steel tower which has an interior plastic coat formed, for instance, by a material such as known under the trade name "Teflon" which is resistant to acids and bases. Disposed in the tower is a column 2 of titanium phosphate in the form of granules from 0.1 to 3 mm. The tower is enclosed by a heat-insulated jacket 3 for circulating hot water which in introduced at 4 and discharged at 5. The bottom of the tower is provided with a grating 6 from which three conduits 7a, 7b and 7c branch out. The apertures of the grating 6 are sufficiently small to prevent entrainment of the titanium phosphate granules.

Pumps 8 and 9 operative in either direction are disposed on conduits 7a and 7b for feeding and emptying tower 1 at a constant rate of input and output. Tanks 10 and 11 disposed at the end of conduits 7a and 7b provide for the storing of the treating solutions for the tower 1. Valves 12a and 12b in conduit 7a and valves 13a and 13b in conduit 7b serve to cut off the tower 1 from the tanks 10 and 11. In tank 10 there is also provided a heating spiral. Conduit 7c is equipped with a valve 15 and serves for the emptying of tower 1 into a tank 16. Conduit 17 permits the passing of the overflow from the tower 1 towards tank 18.

There will now be described two illustrative operations for separation of the metals nickel and cobalt following the teachings of the invention.

EXAMPLE I

One proceeds from a New Caledonia laterite with a contents of 48% iron, 3.1% chromium, 1.5% nickel and 0.22% cobalt. This laterite for the purpose of the cobalt and nickel extraction was first submitted to a conventional selective reduction in a fluidizing bed at 850° C. by means of a gaseous mixture of $CO+H_2$. In the course of this operation, it was only nickel and cobalt which were reduced to the metallic state; for instance, the iron was reduced only to ferrous oxide. The nickel and cobalt were then dissolved by treatment with an ammonium carbonate solution with a content of 70 grams of ammonia per liter and 40 grams of $CO_2$ per liter. As a result, there were present in the solution 8 grams per liter of nickel and 0.7 gram per liter of cobalt.

The solution was thereupon fed by conventional means into tank 11. Pump 9 was then started up and valves 13a and 13b were opened. The solution in tank 11 after heating to 50° C. by means of the spiral 14 then started to flow through conduit 7b and pass through the bottom into tower 1, which latter had a diameter of 1 meter. The constant flow of the solution driven by pump 9 amounted to 1.28 m.³ per hour and the rising speed in column 2, which had a height of 4 meters, was about 1.3 m. per hour.

After passing through column 2, where the cobalt was absorbed, the solution was evacuated by overflow into conduit 17, from where it flowed into vessel 18. The temperature of the column was maintained at 50° C. by means of the hot water jacket 3, in which the temperature at the point of admission, that is at 4, was brought up to 55° C. to offset thermal losses.

The operation could thus be carried on continuously for 150 hours. At the end of this period, the inflow of ammonia solution was discontinued.

The solution which was discharged by overflow into tank 18 showed the following analysis: It contained 8000 mg./liter of nickel and only 15 mg./liter of cobalt. The share of nickel, therefore, was 99.8%. The nickel was then recovered in a conventional manner by distillation of the ammonia from the solution.

The direction of action of the pump 9 was thereupon reversed so that tower 1 was emptied and the solution, with some cobalt still present in it, pumped back into tank 11. Pump 9 was then stopped and the valves 13a and 13b were closed. The tank 10, which had been filled with water, was then connected with the tower 1. For this purpose, pump 8 was put into operation and valves 12a and 12b were opened. The water entered the bottom of tower 1 through conduit 7a. After filling up the tower, pump 8 was stopped and valves 12a and 12b were closed. By now opening valves 13a and 13b and by means of pump 9, the washing water was driven back into tank 11. These wash operations were repeated several times.

Tank 10 was then filled with hydrochloric acid of a technical grade and a 100 times dilution, and the tank was connected with tower 1 by operating pump 8 and opening valves 12a and 12b. The cobalt absorbed by the titanium phosphate was rapidly dissolved by the acid, which at the same time regenerated the titanium phosphate, as indicated above. At the end of one hour, the tower was emptied by evacuating the acid solution through conduit 7c in to tank 16 after opening valve 15. This filling and emptying operation was repeated three times. After that, a water rinse was carried out as before, the water being likewise evacuated into tank 16. The solution collected in tank 16 had a content of 400 mg. of cobalt per liter and 3 mg. of nickel per liter, that is, it consisted of 99.2% cobalt. The latter was then extracted from the acid solution electrolytically.

EXAMPLE II

With a view again to subsequent extraction of nickel and cobalt a Madagascar laterite was used containing 47% iron, 2% chromium, 0.7% titanium, 1.1% nickel and 0.20% cobalt. A selective reduction at 800° C. was effected by means of a gaseous mixture containing 25% by volume of CO and 25% of $CO_2$ and 50% nitrogen. There were thus obtained nickel and cobalt as the only substances in metallic state. The two metals were then dissolved by treatment with an ammonium carbonate solution containing 70 g./liter or ammonia and 40 g./liter of $CO_2$. At the end of this operation, the solution contained 10 g./liter of nickel and 1.2 g./liter of cobalt.

The solution was thereupon fed into tank 11. Pump 9 was started in operation and valves 13a and 13b were opened. The solution from tank 11 after heating to 50° C. by heating spiral 14 now passed through the duct 7b and into the bottom of tower 1. The constant flow of the solution driven by pump 9 was 2.2 m.$^3$ per hour and the speed of rising about 2.8 m. per hour.

As soon as the solution had passed through column 2, where the cobalt was absorbed, it was removed by overflow through conduit 17, from where it flowed into vessel 18. The temperature in column 2 was maintained at 50° C. by means of a hot water jacket 3, the temperature of the hot water at the point of admission at 4 being brought up to 55° C. to offset thermal losses. This operation was carried on for 122 hours. At the end of this period, the inflow of ammonia solution was discontinued.

The solution removed by overflow into tank 18 showed the following analysis: 9800 mg./liter of nickel and only 15 mg./liter of cobalt. The share of nickel was therefore 99.85%. The nickel was thereupon recovered by distillation of the ammonia from the solution.

The direction of operation of the pump 9 was thereafter reversed. Tower 1 was emptied and the solution with some cobalt still present in it was forced back into tank 11. Pump 9 was then stopped and the valves 13a and 13b were closed. Tank 10 with water in it was then connected with tower 1. To accomplish this, pump 8 was put into operation and valves 12a and 12b were opened. The water entered the tower 1 through duct 7a. As soon as the tower was full, pump 8 was stopped and valves 12a and 12b were closed. Valves 13a and 13b were then opened and the wash water was forced back into tank 11 by means of pump 9. These washing operations were repeated three times.

Tank 10 was then filled with hydrochloric acid of a technical grade and a 100 times dilution and the tank was connected with tower 1 by operating pump 8 and opening valves 12a and 12b. The cobalt, which had been absorbed by the titanium phosphate, was rapidly dissolved in the acid which at the same time effected a regeneration of the titanium phosphate. (The titanium phosphate in this example was in the form of grains having a granule size between 0.5 and 2.5 mm.) The tower was emptied at the end of one hour by passing the acid solution through conduit 7c into tank 16 after opening of valve 15. This filling and emptying operation was repeated three times, whereupon a rinse was effected, as previously, with water which was evacuated into tank 16.

A sample of the solution from tank 16 contained 320 mg. of cobalt per liter and 3 mg. of nickel per liter, which gives a 99.1% content of cobalt. The latter was electrolytically extracted from the acid solution as in the first example.

One of the advantages of the method of the invention is that the separation of the two metals is practically complete after a single operation. Actually, it was found that cobalt extracted was 99.2% pure and that the titrated nickel was 99.8% pure. Such purity is above the commercial standards for the trade which require a content superior or equal only to 99% degree purity.

Another advantage of the invention resides in the very high yield of metal. Thus, from the amounts contained in the initial ammonium carbonate solution one recovers 97% of the cobalt and 99.5% of the nickel.

It will be understood that the just given examples are not intended to impose any limitations of the scope of the invention. One could, for instance, use several towers with titanium phosphate, of which one or some may only serve for the absorption of the cobalt while in others the titanium phosphate would be regenerated with hydrochloric acid to permit a continuous operation. One could also arrange several towers in series with an increasing degree of fixation of cobalt and a cyclical regeneration of titanium phosphate.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:

1. A process for separating nickel and cobalt dissolved in a carbonated ammoniacal solution obtained by treating a mineral ore containing both nickel and cobalt comprising the steps of passing the solution through titanium phosphate at a temperature of between 20° and 80° C. to cause adsorption therein of substantially all of the cobalt; recovering substantially all of the nickel from the solution that has passed through the titanium phosphate; passing an acid solution through the titanium phosphate to dissolve the cobalt and recovering the cobalt from said acid solution.

2. The process of claim 1, wherein the titanium phosphate is placed in a reaction tower and the ammoniacal solution is caused to pass through the tower in an upward direction.

3. The process of claim 1, wherein the titanium phosphate is placed in a reaction tower, a carbonated ammoniacal solution is caused to pass through the tower in an upward direction and thereafter an acid solution is circulated through the tower to dissolve the cobalt and to regenerate the titanium phosphate, the nickel being recovered from the discharged ammoniacal solution and the cobalt being extracted from the acid solution after passing through the titanium phosphate.

4. The process of claim 1, wherein the titanium phosphate is in the form of granules obtained from agglomerating a phosphate powder with a polymerizable resin.

5. The process of claim 1, wherein the agglomerate is formed cold and wherein the polymerizable resin has a hardening temperature below 100° C.

6. The process of claim 1, wherein the acid solution is a hydrogen chloride solution which effects the regeneration of the titanium phosphate by an ion exchange process.

7. The process of claim 3, wherein the temperature of the titanium phosphate is about 50° C.

8. The process of claim 1, wherein the nickel and cobalt containing ammoniacal solution is obtained by treating a laterite mineral in which these two metals are present.

9. A process for separating nickel and cobalt dissolved in a carbonated ammoniacal solution comprising the steps of passing the solution from bottom to top through a tower containing titanium phosphate in granular form while the temperature in the tower is maintained at between 20° and 80° C. so as to cause adsorption therein of substantially all of the cobalt, discharging the ammoniacal solution from the tower, recovering substantially all of the nickel from the latter solution, passing an acid solution through the tower to dissolve the cobalt adsorbed by the titanium phosphate and to regenerate the titanium phosphate, discharging the acid solution from the tower and extracting the cobalt from the acid solution.

10. The process of claim 9, including repeated water washes of the column after passing the ammoniacal solution therethrough, adding the wash water solution to the acid solution and repeatedly cycling the combined wash and acid solution through the tower for dissolving the cobalt and finally recovering the cobalt from the acid solution.

11. The process of claim 10, which is carried out in a continuous process, the washing treatment and adding of the wash water to the combined solution and recycling of acid through the tower being effected by repeated reversals of flow between the sources of water and acid on the one hand and the tower on the other hand.

References Cited

UNITED STATES PATENTS

| | | | |
|---|---|---|---|
| 2,848,322 | 8/1958 | Conn et al. | 23—50 X |
| 3,056,647 | 10/1962 | Amphlett | 23—50 X |
| 3,332,737 | 7/1967 | Kraus | 23—50 |

OTHER REFERENCES

Chemical Abstracts, vol. 61, 1964, p. 2700d.

I. K. Tsitovitch et al.: "Dokl. Akad. Nauk. SSSR, vol. 156, January 1964, pp. 110–113.

OSCAR R. VERTIZ, Primary Examiner

G. O. PETERS, Assistant Examiner

U.S. Cl. X.R.

23—50